(12) United States Patent
Arno (10) Patent No.: US 7,475,556 B2
(45) Date of Patent: Jan. 13, 2009

(54) SYSTEM AND APPARATUS CONTROLLING A VARIABLE SPEED COMPRESSOR SYSTEM

(75) Inventor: David R. Arno, East Amherst, NY (US)

(73) Assignee: Parker Hannifin Corporation, Cleveland, OH (US)

( * ) Notice: Subject to any disclaimer, the term of this patent is extended or adjusted under 35 U.S.C. 154(b) by 449 days.

(21) Appl. No.: 11/082,111

(22) Filed: Mar. 15, 2005

(65) Prior Publication Data

US 2005/0198981 A1 Sep. 15, 2005

Related U.S. Application Data

(60) Provisional application No. 60/553,051, filed on Mar. 15, 2004.

(51) Int. Cl.
*F25D 17/06* (2006.01)
*F25B 49/00* (2006.01)

(52) U.S. Cl. .................... 62/93; 62/228.3; 236/44 R (58) Field of Classification Search .............. 236/44 R; 62/93, 228.1, 228.3
See application file for complete search history.

(56) References Cited

U.S. PATENT DOCUMENTS

| | | | |
|---|---|---|---|
| 2,334,427 A * | 11/1943 | McGrath | ............... 96/112 |
| RE33,775 E | 12/1991 | Behr | |
| 5,345,776 A * | 9/1994 | Komazaki et al. | ........... 62/176.3 |
| 5,617,731 A * | 4/1997 | Scaringe | ................ 62/149 |
| 6,393,850 B1 * | 5/2002 | Vanderstraeten | ........... 62/196.3 |
| 6,467,292 B1 * | 10/2002 | Praxmarer et al. | ......... 62/228.4 |
| 6,490,877 B2 | 12/2002 | Bash | |
| 6,516,626 B2 | 2/2003 | Escobar | |
| 6,817,198 B2 * | 11/2004 | Wilson et al. | .............. 62/228.3 |
| 6,894,761 B2 * | 5/2005 | Ayash et al. | ................. 355/30 |
| 2002/0152634 A1 * | 10/2002 | Tedman et al. | ................ 34/475 |

* cited by examiner

*Primary Examiner*—Marc E Norman
(74) *Attorney, Agent, or Firm*—Kloss, Stenger & Lotempio; Vincent G. Lotempio (57) ABSTRACT

The present invention relates to a method and apparatus for effectively reducing/eliminating shut-downs while still allowing an air or gas dryer apparatus to operate even though the conditions, even extreme conditions, may be out of range. The present invention comprises a system and apparatus controlling a variable speed compressor system for an air or gas dryer, the system and apparatus comprising a set point value that causes system shut down when reached and an algorithm that operates using the set point value. A sensor that provides an input value to the algorithm whereupon the algorithm compares the input value to the set point value, a circuit carrying output of the algorithm, a controlled device responding to the output and a feedback circuit that operates to maintain a product value at a set point or within a set range where the algorithm operating to modulate or bypass the feedback circuit when the input value approaches the set point.

10 Claims, 5 Drawing Sheets

SYSTEM AND APPARATUS CONTROLLING A VARIABLE SPEED COMPRESSOR SYSTEM

This application claims priority of U.S. Provisional Patent Application 60/553,051 filed on to the Mar. 15, 2004, titled: REFRIGERANT GAS/AIR DRYER EMPLOYING VARIABLE FREQUENCY DRIVE TO CONTROL THE COMPRESSOR SPEED WITH ENHANCED PROCESS RENDERING SUPERIOR DEW POINT PERFORMANCE.

BACKGROUND OF THE INVENTION

1. Field of the Invention

The present invention relates to the field of refrigerant, compressed gas or air dryer systems, and more particularly to a variable frequency drive process to control compressor speed to yield higher quality gas or air dew point output at significant energy savings. The invention also relates to algorithms and methods used to reduce or eliminate undesired or unnecessary dryer cycling.

2. Background

Presently, many industrial applications using air or gas driven machinery have a need for dry air or gas in the process of operating, product process, product fabrication, as well as many other applications. Air or gas driven machinery is most commonly operated using pressurized, i.e., compressed air or gas that contains water that can react on or condense within product or apparatus and negatively impact the air or gas usefulness. Moisture in the form of condensation or precipitation in machinery or on product negatively impacts the product process systems by causing costly equipment maintenance or equipment failure and befouled product.

Refrigerant dryers are the most common devices to remove moisture from compressed air or gas for such industrial uses, thus reducing failures and improving product quality. The water content quality of the air or gas being dried, at the dryer's output is measured in terms of dew point, the temperature where water vapor in the air or gas is at 100% humidity; the lower the dew point temperature, the greater the dryness of the air or gas. Dryer air or gas is considered higher quality. Industry desires a gas or air of sufficient quality to prevent water from damaging machinery or fouling product.

There are several types of refrigerant air or gas dryers, the following list includes more conventional systems: Cycling Dryers, Non-Cycling Dryers and Variable Speed Drive Dryers. In general, refrigerant air or gas dryers have: 1) a refrigerant compressor (with an appropriate accumulator and receiver); 2) a series of heat exchanger vessels and/or other 'heat' transfer components; 3) a condensing component; and a 4) a refrigerant process controller having one or more of the following: expansion, pressure regulating, bypass valves; solenoids and electronic sensors/controls; an optional variable speed drive (VSD) system for the compressor motor.

These systems all operate on various levels of efficiency, both with respect to cost and dew point performance. In common practice, a certain type of cycling air or gas dryer includes an unloading feature that to allows the compressor motor to power down, i.e., to coast or free wheel during periods of low demand for refrigerant cooling. Thus, a cycling dryer is considered an energy savings dryer when compared to a conventional non-cycling system.

Another example of energy savings may be found in a system configured with a variable speed drive (VSD) device to decrease power to or to slow-down the compressor during lull intervals, periods of less demand for refrigerant cooling. Such a system is also considered to be an energy savings dryer because the compressor consumes less energy during the lull intervals.

Although over the years many of these systems have achieved improved operating costs, with various configurations of the basic system elements as outlined above, even these improved conventional systems suffer in dew point output performance of air or gas being dried. Under these economical conditions often the dryer will function at the peril of the wellbeing of the dryer itself. Further, these conventional systems are susceptible to adverse effects due to abnormal operational stresses associated with external conditions not within the control of the dryer apparatus, e.g., high inlet temperature, high ambient over loading the dryer capacity flows, unexpected condensing high ambient conditions, etc.

As with most machinery, air or gas dryers are designed to work under defined load and environmental specifications. Design specifications are also provided relating to output volume and output quality. For example when design specifications are exceeded from unexpected demand or a changed operating environment that causes an increased load, conventional systems react by increasing demand on the refrigerant compressor. When the increased output of the refrigerant compressor does not correct operational parameters to normal ranges, continued signals are sent to the refrigerant compressor to further increase output. Eventually a set parameter such as a refrigerant discharge pressure parameter incorporated as a failsafe to protect the machinery or for personnel safety will be exceeded causing sudden refrigerant system shutdown. Sudden refrigerant system shutdown results in reduced quality in the compressed air or gas because dew point is no longer under any control. These shutdowns not only impact production schedules and plant maintenance, but also product quality suffers and waste product disposal costs are severely increased.

Another example of when design specifications are exceeded is when the source of inlet air has a temperature above the design specifications; such as 100° F. inlet raises to 110° F., 120° F. or even 130° F. or higher due to an air compressor or after cooler problem and the like. Still another example is when ambient air around the condensing unit becomes too hot; for example, in summertime conditions, in the compressor rooms or where the apparatus may have insufficient air circulation, due to fouled condenser elements. Yet another example can be found typically on water cooled system, when cooling water flow dwindles or is not sufficiently cool.

These are but a few examples of problems that can singularly, adversely affect dryer operations resulting in poor dew point performance, waste of energy and wear-and-tear on equipment. In combination, these problems most certainly could be expected to lead to damage of not only the dryer apparatus, but significantly affect down-time of compressed air or gas equipment and of the manufacturing process in which the compressed air or gas is being used. Thus although a highly efficient refrigerant air and gas dryer is desired, if the system causes undesired loss of performance and plant shut downs, the efficient system may not be cost effective.

Thus it is readily apparent that there is a longfelt need for a structure and process to effect a more efficient driving of a variable speed refrigerant compressor, specifically a system that continues to function with only a minimal negative effect on dew point when it is operating outside design parameters and will only shut down when a true protective condition is warranted. It is clear there is a need for a system that minimizes or prevents refrigerant air or gas system shut downs that result in large amounts of high dew point compressed air flowing through the dryer and into the manufacturing plant and process. The present invention seeks to alleviate the problems associated with the present art by providing a refrigerant air or gas dryer with a means to avoid sudden system shut down by continuing to function when design parameters are breached.

SUMMARY OF THE INVENTION

Therefore, it is an object of the present invention to provide an improved refrigerant air or gas dryer with a means to avoid sudden system shut down by continuing to function when design parameters are breached.

It is another object of the present invention to provide a compressor head or refrigerant discharge pressure value as the set point value where that set point value is designed to cause or effect system shut down when reached coupled with an algorithm to minimize or prevent shut down that operates to avoid reaching this set point value.

It is another object of the present invention to provide an improved refrigerant air or gas dryer with a means to reduce or eliminate shut-downs at times where the external conditions make dynamic demands on the refrigerant system.

It is another object of the present invention to use controlled feedback to formulate an algorithm which determines the best possible speed to drive a variable speed drive device.

It is another object of the present invention to provide an improved refrigerant air or gas dryer that will produce an alarm and alert user that less than ideal conditions are prevalent as the dryer continues to produce dry air.

Still another object of the present invention is to provide enhanced control to a variable speed driven refrigerant air or gas dryer systems.

One aspect of the present invention features a system and apparatus controlling a variable speed compressor system for an air or gas dryer device. This aspect includes a set point value that causes system shut down when the set point value is reached. The shut down results in complete cessation of compressed air conditioning resulting in severely deteriorated quality in the compressed air. This aspect avoids, prevents or delays such occurrence by providing an algorithm that operates using the set point value and a sensor that provides an input value to said algorithm. Preferably the algorithm compares the input value to said set point value. This aspect also features a circuit that carries output from the algorithm to a controlled device that responds to the output. Preferably this aspect includes a feedback circuit that operates to maintain a product value such as a dew point value, a temperature value, a pressure value, etc. at a desired or designed set point or within a desired or designed set range. A preferred function of the algorithm is to modulate or bypass the feedback circuit when said input value approaches said set point.

A preferred aspect of the present invention features a pressure value as the set point value that causes system shut down when the set point value is reached.

Another aspect of the invention features a variable compressor, preferably a variable compressor varied by a drive frequency as a controlled device.

In several aspects of the present invention the feedback circuit is modulated or bypassed when said input value reaches or exceeds about a value selected from the group consisting of 80%, 85%, 90%, 95%, 98% and 99% of the set point value. For example, the set point may have a range of acceptable values, the minimum set at 0% and the set point at 100%. The feedback circuit is preferably modulated or bypassed when the input value reaches or exceeds about a value selected from the group consisting of 80%, 85%, 90%, 95%, 98% and 99% of this range.

Preferred refrigerants featured for use in the present invention include R22, 410A, 407C, R12, 134a, 401a, 409A, 502, 404a, 507, 414b and 402a.

A desirable aspect of the present invention features a refrigerant air or gas drying system with i) a feedback process to control dew point and ii) at least one set point that causes said system to shut down when said set point is reached. Preferably the conventional system is improved by including an algorithm and apparatus to run the algorithm. A preferred system and algorithm comprise at least one sensor to obtain an input value for the algorithm and at least one input circuit to input the value to the apparatus to run the algorithm. Preferably, a receiver receives an output from running the algorithm and responding to the algorithm effects abandoning or modulating dew point control in the air or gas drying system as the set point is approached.

Yet another aspect of the present invention features a system and apparatus controlling a variable speed compressor system for an air or gas dryer device. This aspect includes a set point value designed to cause or effect system shut down when reached coupled with an algorithm to minimize or prevent shut down that operates to avoid reaching this set point value set point value. Preferably a sensor provides an input value to the algorithm whereupon the algorithm compares an input value to a value range corresponding to the input. This aspect also preferably includes a circuit carrying output of the algorithm to a controlled device that responds to the output and in responding avoids the system and apparatus reaching the set point for shutdown. Most preferred is an algorithm that operates to modulate the controlled device when the input value is outside the value range corresponding to the input.

A preferred set point value is a compressor head or refrigerant discharge pressure set point value. In this preferred embodiment, the sensor provides a discharge pressure value to the algorithm which outputs to a controlled device, for example, a compressor.

Aspects of the invention include a preferred set point value of discharge pressure however other set point values can be used in addition such as those selected from the group consisting of cooling water temperature, air inlet temperature, ambient temperature, and air flow volume, for example, airflow over a condenser element and compressed air output from a compressor.

A featured method of the present invention comprises a method of delaying or avoiding shutdown in a gas or air dryer. Preferably, a value approaching a set point value that shuts down the system is sensed and the system and apparatus controls operations by modulating operation of the system to delay or avoid system shutdown. For example a preferred method features sensing a value approaching a set point for shut down and continuing operating in a dew point suppression condition instead of shutting down.

A preferred set point value for causing shut down is a discharge pressure value.

Preferred aspects of the present invention feature employing an algorithm that modulates operation of the system.

A preferred modulation featured in the present invention is modulation of a compressor, preferably by controlling drive frequency of a variable speed drive compressor.

A further object of the present invention provides modulation that commences at a value selected from the group consisting of 80%, 85%, 90%, 95%, 98% and 99% of a range with a minimum value set at 0% and a maximum value set at 100%. Preferably the range relates to a crank case discharge pressure of a compressor.

Yet another aspect of the invention features a method wherein dew point in compressed air or gas rises or is allowed to rise above a desired dew point value, but most preferably not to a value exceeding dew point of compressed air before treatment by the air or gas dryer.

A particularly preferred aspect of the invention features a method wherein an input value into the system or apparatus is selected from the group consisting of: cooling water temperature, air inlet temperature, ambient temperature and air flow volume. Preferably, the input value is compared to an acceptable range corresponding to the input value and when an input value outside said range is encountered the system and/or apparatus effects a modulated operation, e.g., reducing compressor speed, to delay or avoid system shutdown.

A further object is to provide enhanced control to a non variable speed driven refrigerant air or gas dryer systems.

Still another object of the present invention is to recognize a serious high discharge pressure problem and to shut-down appropriately.

Another object of the present invention is to provide apparatus and process to effect a more efficient driving of a variable speed refrigerant compressor.

In furtherance of these and other objects, the improved refrigerant air or gas dryer of the present invention generally comprises many combinations of current air and gas dryer technologies, both utilizing variable speed drive and energy efficient refrigerant systems and delivers the best possible dew point when external prevailing conditions are less then ideal.

BRIEF DESCRIPTION OF DRAWINGS

The nature and mode of operation of the present invention will now be more fully described in the following detailed description of the preferred embodiments taken with the accompanying drawing figures, in which.

Table 1 shows an exemplary algorithm that compares a head psi to various values to calculate proximity to high head pressure set point.

DETAILED DESCRIPTION OF THE INVENTION

This application claims priority of U.S. Provisional Patent Application 60/553,051 filed on to the Mar. 15, 2004, titled: REFRIGERANT GAS/AIR DRYER EMPLOYING VARIABLE FREQUENCY DRIVE TO CONTROL THE COMPRESSOR SPEED WITH ENHANCED PROCESS RENDERING SUPERIOR DEW POINT PERFORMANCE.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. §112.

The present invention relates to a method and apparatus for effectively reducing/eliminating shut-downs while still allowing an air or gas dryer apparatus to operate even though the conditions, even extreme conditions, may be out of range. The dryer operates under such condition in a suppression mode and although the output dew point may be diminished the result is much less a problem then that of a shut-down. The improved refrigerant air or gas dryer of the present invention uniquely solves the problem in a way not presently contemplated. The dryer apparatus continues to operate in near 'intolerable extreme' conditions giving capacity at all time, delivering a better suppression dew point than 'no' dew point (as is the case in prevailing condition with conventional dryer systems). The preferred embodiment of the present invention takes advantage of conventional air or gas dryer technologies, both variable speed driven and non variable speed driven, and, energy efficient as well as non energy efficient to produce an improved dry air or gas output with less down time. The improved refrigerant air or gas dryer of the present invention provides a safe and economical utilization of the thousands of existing machines that would otherwise operate at lower efficiency.

The preferred embodiment of the present invention relates to gas or air dryer systems having a refrigerant process controller to control compressor speed to yield higher quality gas or air dew point output at significant energy savings. The variable frequency drive interacts with the thermal dynamics of the system in such a manner to slow down head pressure reaction and yet maintain consistent dew point. When the 'frequency is varied, for example from 60 Hz down to 30 Hz, the speed of the motor would slow down proportionally. However it should be understood that this proportionate slow down is not necessarily linier. The invention also relates to algorithms and methods used to reduce or eliminate undesired or unnecessary dryer cycling. This improved gas or air dryer system further gives appropriate alerts, alarms and warnings as to the source of 'out of range' conditions without shutting down the already stressed system and manufacturing process where the compressed air or gas is being used.

Adverting now to the drawings, FIGS. 1A-D are shown as a general arrangement of components found in typical air or gas dryer system refrigerant air or gas dryer systems. In general, FIGS. 1A-D depict refrigerant air or gas dryers having a refrigerant process controller 10 used in combination with refrigerant compressor 30, suction accumulator 28, liquid receiver 42, a series of heat exchanger vessels such as precooler/reheater 48, evaporator 20 and separator coalescing filter 50. The system also has a condensing component refrigerant condenser 40, expansion valve 16, pressure regulating bypass check valve 54, superheat 22, suction line solenoid 26, air/gas input 44, air/gas output 46, flood level control 24, drain 52 variable speed drive (VSD 12) system regulating the compressor motor.

Figure 1A:
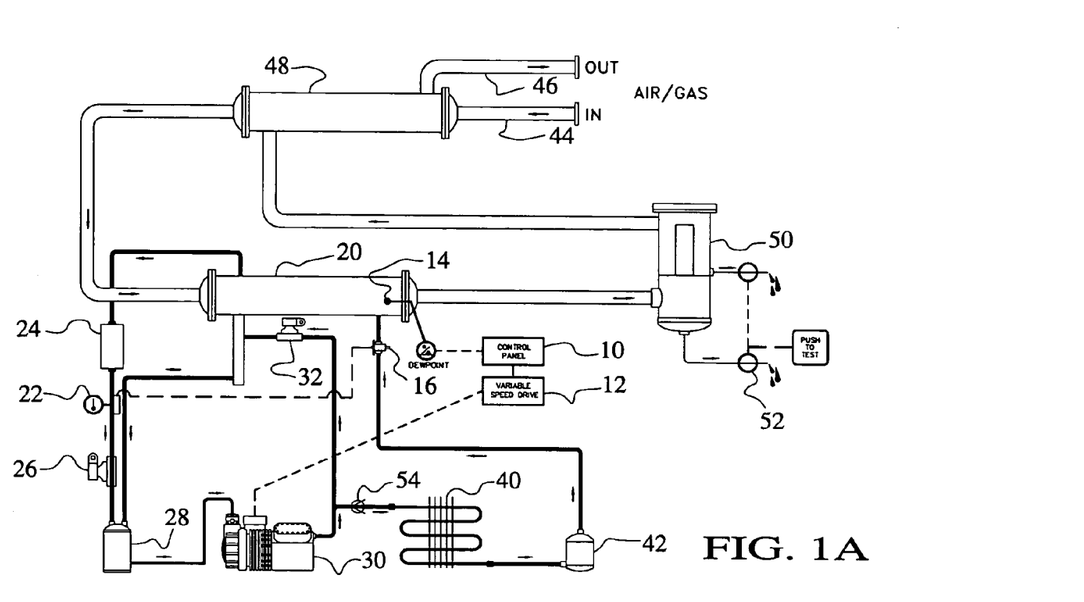
FIG. 1A is an illustration of a refrigerant air or gas dryer system of the present invention wherein a controlling apparatus is used in combination with a variable speed drive and an unloader solenoid.

FIG. 1A is an illustration of a refrigerant air or gas dryer system of the present invention wherein controlling apparatus 10 is used in combination with variable speed drive 12 and unloader 32. This system preferably includes a circuit carrying output of the algorithm to a controlled device that responds to the output and in responding avoids the system and apparatus reaching the set point for shutdown. The present invention provides enhanced control to a variable speed driven refrigerant air or gas dryer system. The variable speed system and controlling apparatus 10 forces a slow-down of the compressor, followed by an unloading process to afford a so-called suppression mode. This system and apparatus produces a suppressed dew point quality instead of a full shut-down. Should the prevailing condition worsen to the degree where the discharge pressure still continues to rise, the 'pull-back' process can further unload the compressor (taking even more load off the system). The important result is that the compressor is still running and producing some degree of drying of the air or gas. The cylinder heads on the compressor are provided normally to reduce the compressor load when the refrigeration system has 'less' demand upon it. The conventional non variable speed driven system only perform the unloading process described above. The refrigerant air or gas dryer system of the present invention wherein controlling apparatus 10 is used in combination with variable speed drive 12 and unloader 32 produces a suppressed dew point quality instead of a full shut-down.

Figure 1B:
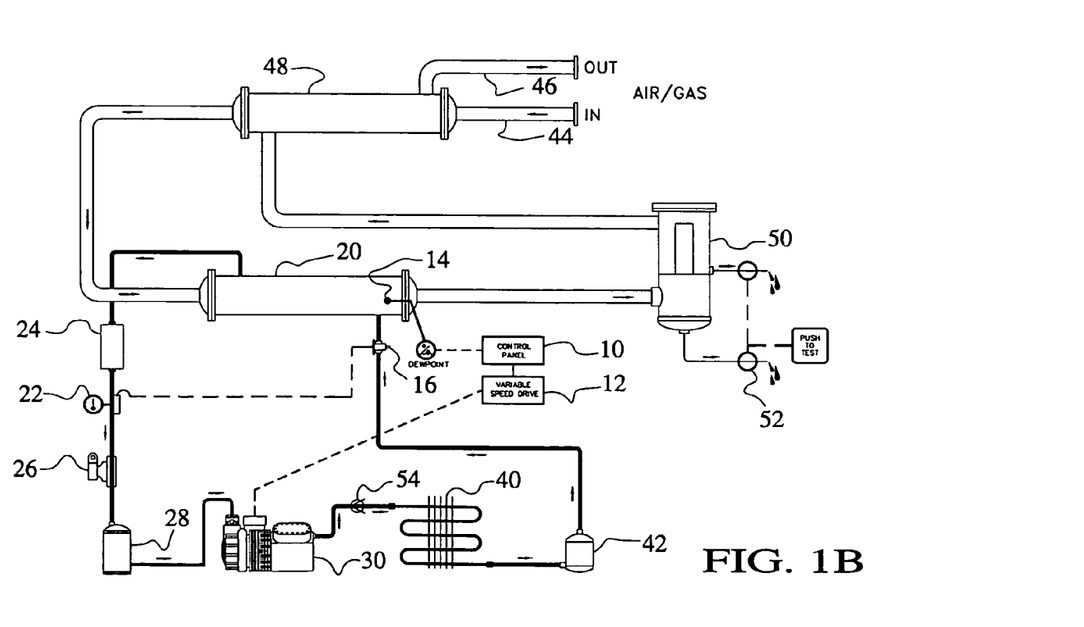
FIG. 1B is an illustration of a flow diagram of a refrigerant air or gas dryer system of the present invention wherein a controlling apparatus is used in combination with a variable speed drive without an unloader solenoid
Figure 1C:
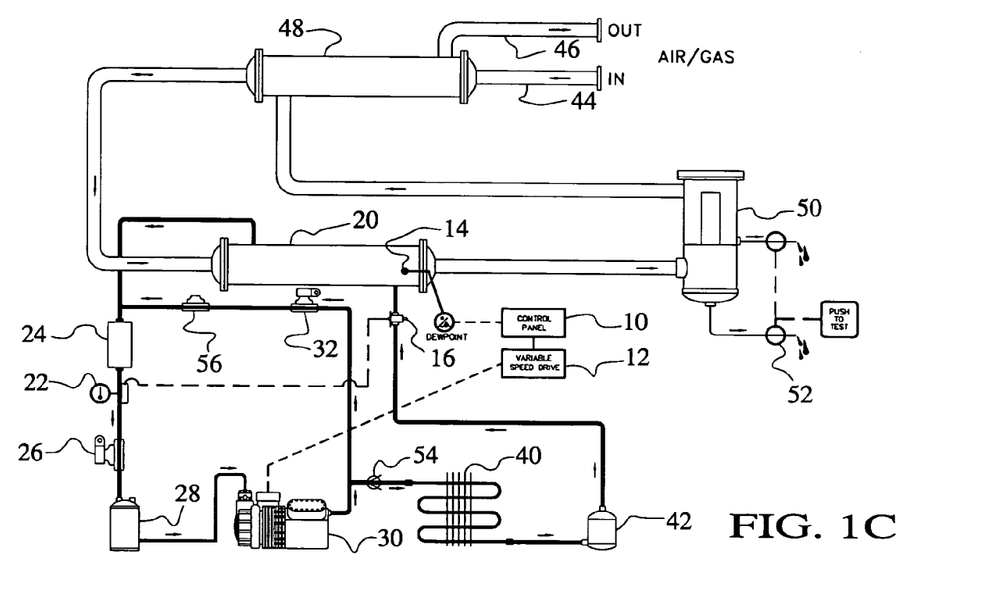
FIG. 1C is an illustration of a flow diagram of a refrigerant air or gas dryer system of the present invention wherein a controlling apparatus is used in combination with a variable speed drive and a cycling hot gas valve arrangement.

FIG. 1B is an illustration of a refrigerant air or gas dryer system of the present invention wherein controlling apparatus 10 is used in combination with variable speed drive 12 without unloader 32. FIG. 1C is an illustration of a refrigerant air or gas dryer system of the present invention wherein controlling apparatus 10 is used in combination with a variable speed drive and employing a cycling hot gas valve arrangement 56 a pressure regulating valve. In this system the cycling hot gas valve arrangement works in combination with variable speed drive 12 which automatically regulates the flow by opening and closing the unloader. This system is mainly used in very large units.

Figure 1D:
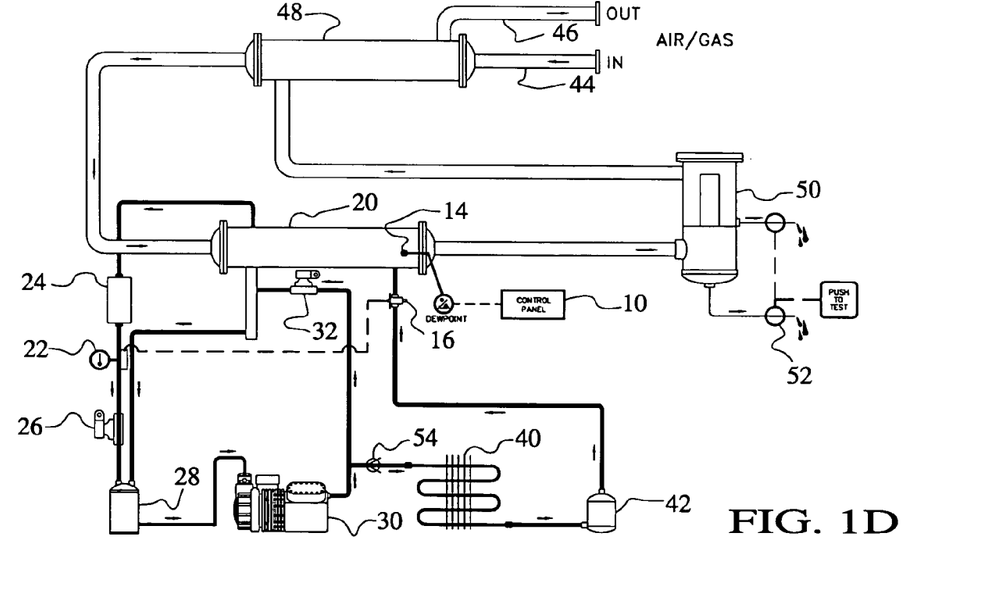
FIG. 1D a is an illustration of a flow diagram of a refrigerant air or gas dryer system of the present invention wherein a controlling apparatus is used in combination with an unloader solenoid.

FIG. 1D is an illustration of a refrigerant air or gas dryer system of the present invention wherein controlling apparatus 10 is used with unloader 32 without variable speed drive 12 to reduce or eliminate shut-downs at times when external conditions make dynamic demands on the refrigerant system. Controlling apparatus 10 uses feedback to govern the dryer capacity at any set of external conditions to deliver a dew point to avoid shutting down of the air or gas dryer. The discharge pressure is the key feedback factor used but it should be understood that other feedback factors such as dew point, suction pressure, suction temperature, and superheat can also be used as a signal to slow down the compressor to 'lessen' the load. All of the above parameters are analyzed to insure the dryer is properly functioning and that the new condition is an environmentally induced situation. The compressor is run at slower than fully modulating speed until the discharge is back into normal range. When discharge pressure is too high the system will 'pull-back' and not attempt to deliver something it can not do. By doing this, it saves itself from shut-down and will continue to deliver at least some refrigeration to the process. The result is continued operation with some level of drying (for example if the set point was 36° F. dew point, it now might be 46° F., or more extreme conditions 56° F.). In a system without the present invention the dew point would completely deteriorate to ambient condition (no refrigeration what so ever) resulting in dryer shut-down, wet compressed air down stream and possibly fouled manufacturing process.

In a conventional system there may be a period of time that the condensing conditions go out of normal range. For example, the cooling water or air flow may be too warm for what ever reason at condenser 40, and cause the refrigerant compressor 30 to experience a rise in discharge pressure. When the compressor discharge pressure rises above a normal operation range (such as when ambient conditions of high temperature resulting in much less then ideal for proper 'condensing' of the newly compressed refrigerant), the discharge pressure will elevate. Should these conditions persist, the refrigeration system can not properly function as a 'cooling' system. As the refrigerant compressor pressure rises the conventional system responds by instructing refrigerant compressor 30 to increase output in an attempt to compensate for the added demand imposed by the condensing problem. Pressure will continue to increase, a call for more refrigeration will occur causing the compressor to run to the maximum and generate even more heat, discharge pressure will get even higher, eventually resulting in a shut-down until a trip switch is actuated. An undesired shut down will result. The shut down causes a very rapid deterioration of the dryer's dew point 14 in the supply of compressed air or gas flowing through it and into the manufacturing plant and process at exit 46. This high dew point condition could damage equipment or foul a manufacturing process using the compressed air.

This example describes the system and apparatus response during and following a period of time when condensing conditions on a conventional variable speed drive refrigerant air dryer go out of the accepted normal range. A specific illustration is when the cooling water temperature temporarily exceeds design specifications and causes refrigerant compressor 30 to experience a rise in discharge pressure. In a R22 refrigerant system with a common normal discharge pressure typically around 200 to 250 PSI the discharge pressure slowly rises incrementally to somewhere about 300 to 350 PSI (other refrigerants, such as 134a, 404a 407c, 410a, 401a 402a, 414b, 409a, 502, 507, etc., each have their distinctive operating pressure ranges—all of which are well know in the art). The increased pressure occurs because the conventional system responds by running refrigerant compressor 30 as hard as possible to try to correct for the added demand imposed on it by the condensing problem. In the conventional system, the system high pressure safety switch would then cause a shut-down. If a refrigerant air or gas dryer system using controlling apparatus 10 of the present invention is challenged with the same conditions, the modified signal to the variable speed drive mechanism results in a modified discharge pressure measure (for example, only about 310 to 320 PSI). This range of PSI is high but still in the operating range of the system without tripping and shutting down. For example, The system and controlling apparatus of the present invention when presented with conditions causing the discharge pressure to rise to an elevated pressure range of 300 to 350 PSI, controlling apparatus 10 recognizes the futility of continuing to increase drive to the compressor, and throttles-back the variable speed drive to maintain a pressure below a pressure that trips the refrigerant system to a shut down. In accordance with the present invention the normal range of 200 to 250 PSI of discharge pressure is exceeded as the temporary condensing condition demands more and more from the refrigerant compressor and a more favorable result is achieved. That is, as the discharge pressure rises into about the 330 PSI range (elevated from the 200 to 250 PSI normal ranges), controlling apparatus 10 produces a signal to the variable speed drive to respond accordingly; with increased speed to match the added demand. But as the discharge pressure continues to approach the shut down value of about 350 PSI, controlling apparatus 10 of the present invention signals to throttle-back and slow the compressor speed, thus avoiding shut-down and maintaining a manageable if not ideal discharge pressure and dew point. Slowing down the compressor speed exponentially increases the condensers capacity. Thus, a modified discharge pressure in the operating range of the of the system results of without tripping and shutting down the system. In this example, a high PSI of 310 or 320 results, without a shut down.

It should be understood that the condensing problem example described above is but one of many external conditions that negatively impact refrigerant dryer systems. Other conditions, either individually or collectively can cause the same kind of out of range, but not dangerous to machine or operator parameters. For example, a compressed air inlet elevated temperature at compressed air inlet due to a compressed air compressor problem; an after cooler problem; a periodic high compressed air usage and demand; a fouling of the condenser elements; and a high ambient temperature; etc., are all factors that can cause a shut down. However a system configured with controlling apparatus 10 of the present invention continues to process compressed air albeit at a lower efficiency. Any of these factors would cause an unnecessary shut-down of conventional refrigerated air/gas dryers (variable speed driven or not) accompanied by a deleterious downstream consequence. By 'controlling' frequency drive output to deliver only what is needed to keep the system functioning in times when conditions are extreme and less than ideal the system will never shut down except when a true protective condition is warranted.

The system of the present invention can indefinitely operate under adverse conditions as long as the user can accept the less than ideal dew point performance. Also, the system of the present invention provides an alarm to warn a user of less than ideal dew point operations. The system of the present invention has appropriate alarming signals that are generated when the routine is active, i.e., throttling back the refrigerant compressor when prevailing conditions indicated that a shut-down is imminent. The alarm is a warning that the dryer output is less than ideal. Once alerted the user can evaluate the situation and act appropriately. A system that is throttling back (lowering the VSD speed/frequency) can divert refrigerant through unloader 32 to disrupt the shut-down sequence. In accordance with the present invention a user encounters far fewer negative service and production issues due to unnecessary shut down as compared to conventional refrigerant air or gas refrigerant dryer systems (of either so called energy saving conventional systems or non energy saving conventional systems). An energy saving system is one that 'unloads' of 'cycling' dryer (dryers that load then unload as to demand). Also systems that vary the speed (slow down at lower demands) configured with controlling apparatus 10 go into what we call thermal bank mode, e.g., drive to a lower dew point temperature 30° F. then shut off at very low or no demand.

Figure 2:
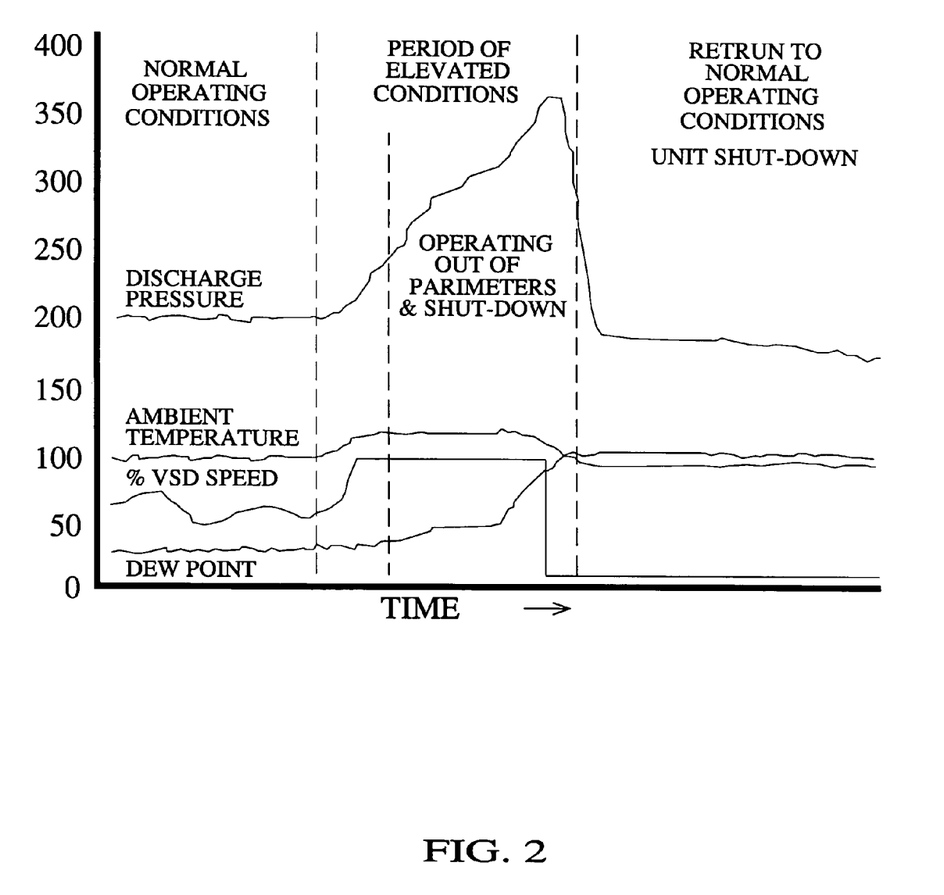
FIG. 2 is a graph showing a typical refrigerant discharge pressure when external conditions would cause it the raise out of range and shut-down.

FIG. 2 is a graph showing the rise of refrigerant discharge pressure up and out of proper operating range because of external conditions. In this illustration, ambient temperature rises. The ambient pressure/condensing problem imposes an irreconcilable stress on the system and the system discharge pressure rises to compensate for the increased dew point resulting from the increased ambient temperature. Discharge pressure continues to rise as the system attempts to bring dew point to an ideal level. The compressor continues to be driven in a futile attempt to make dew point ideal and finally discharge pressure reaches 360 in this example causing a shut down of the drying system. Dew point is no longer controlled; the compressed air is not conditioned. Even when ambient temperature returns to a normal value, the system remains in a shut down mode provide compressed gas or air that is not conditioned for dew point.

In contrast when ambient pressure/condensing problem imposes the same conventionally irreconcilable stress on the system the present invention maintains a degree of dew point conditioning. The dew point would suffer by the dryer functioning less efficaciously than designed during this stressed period of time, but, the refrigerant dryer system does not shut-down. In this example, as the condensing problem condition continues, the refrigerant compressor is driven slower; thus creating less discharge pressure that, although is above the normal range, is well within the safe operating range (As shown in See FIG. 3).

Figure 3:
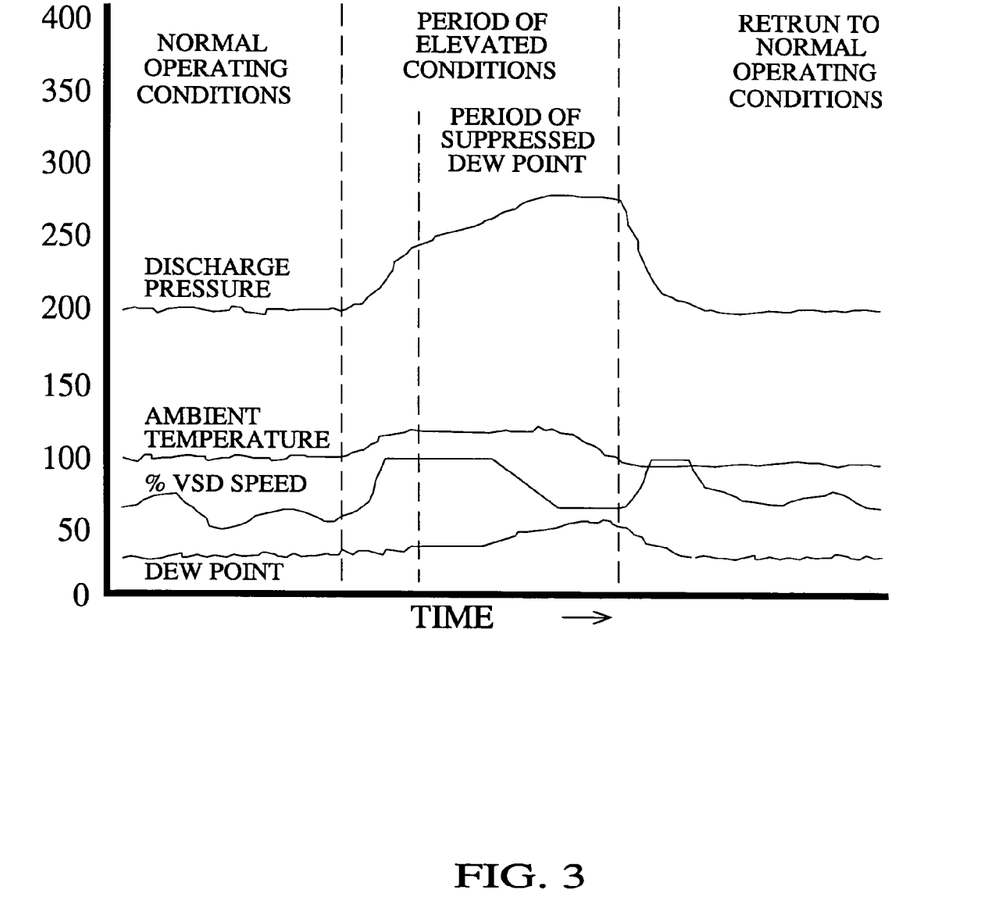
FIG. 3 is a graph showing refrigerant discharge pressure with the present invention 'throttling-back' by entering into a "suppression dew point mode" and preventing a shut-down.

FIG. 3 is a graph depicting the same conditions as prevailing in FIG. 2 however the variable speed was driven to produce a lesser discharge result. The result clearly illustrates the reduced discharge pressure with suppression dew point mode of operation without a shut-down of the system. If continued or increased demand, e.g., increased ambient temperature, causes a further increase discharge pressure, variable speed controls instruct the compressor to continue to throttle-down at a determined rate. In each of these dynamic steps, the present invention causes less and less compressor output until the over-range condition (for example water temperature and/or compressor output pressure) is resolved. It should be understood to one skilled in the art that the dew point of the compressed air flowing through the air or gas dryer deteriorates as these dynamics play out. But the system continues to process the compressed air without a shut-down. Thus dew point suppression conditioning provided in accordance with the present invention is better than no dew point conditioning obtained in a shut-down situation. Because the system and apparatus of the present invention would alter the drive signal to the refrigerant compressor when conditions deteriorate, only a minimal negative impact on dew point quality occurs, but shut-down with its deleterious downstream effects is avoided. When conditions prevail, the system would jump into a 'save' mode, lowering the frequency (speed) of the VSD, unloading, etc. The system 'lives' for another day and all the while delivering some degree of drying process and the system sends an alarm to warn that "out of normal" operating conditions exist and that normal dew point is suppressed. When operating conditions return to normal, the routine jumps back to normal operations.

It is explicitly understood that the present invention applies to both variable speed driven and non variable speed driven refrigerant air or gas dryer systems. Further, the present invention applies to improved energy efficiency or non energy efficient refrigerant air or gas dryer systems. The apparatus and operating system of the present invention enhances any compressed air or gas drying system by allowing operation with a suppressed dew point mode of operation. This allows the system to continue to operate in less than ideal internal and external conditions. The system and controlling apparatus of the present invention determines when a safety or protection shut-down is in fact required.

Figure 4:
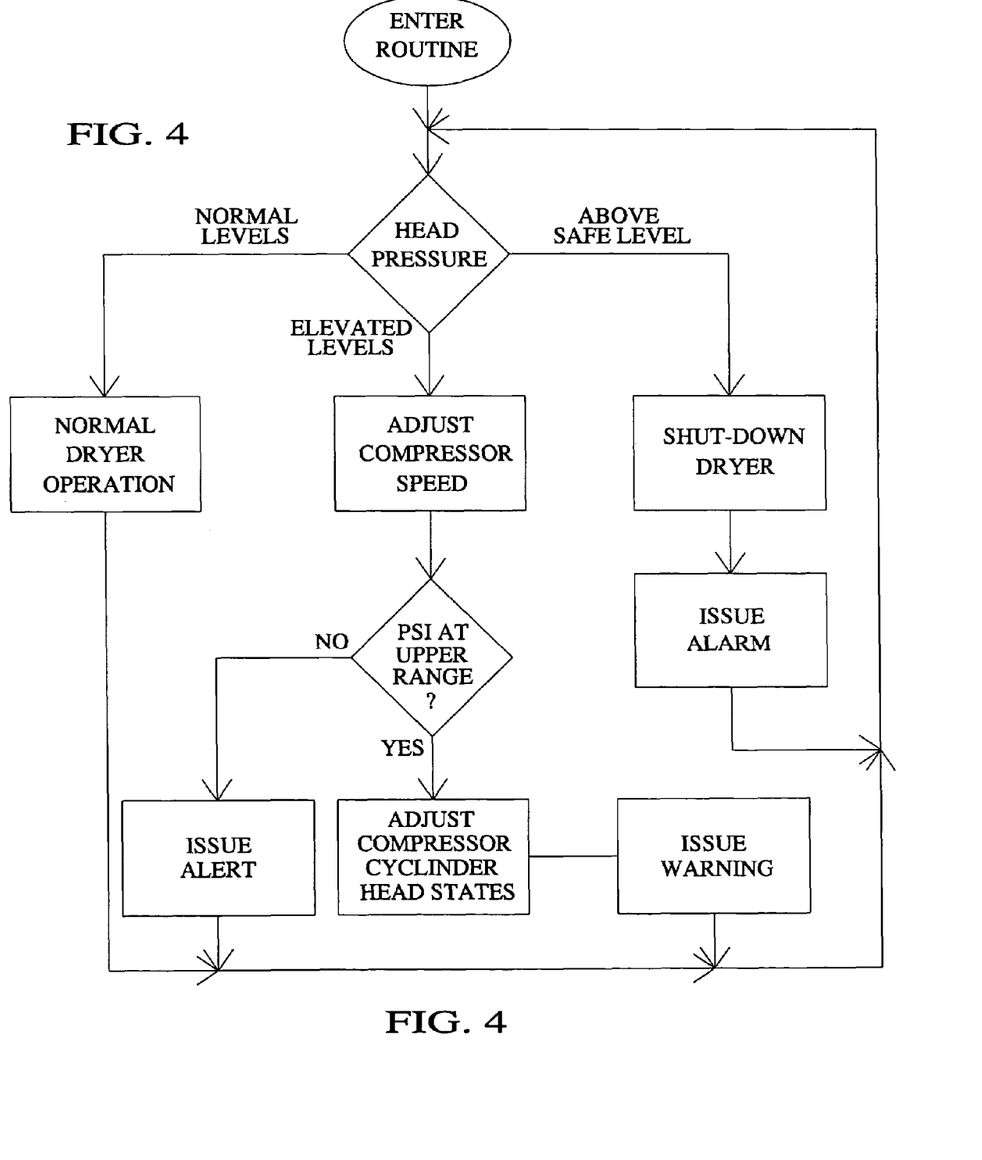
FIG. 4 shows a logic flow diagram illustrating an embodiment of the present application.

FIG. 4 shows a logic flow diagram illustrating an embodiment of the present application. FIG. 4 shows "head pressure" in a decision block. However, any out of range sensor value, for example, ambient temperature, water temperature or flow or air flow volume could be used in addition in this decision block to this flow diagram. Table 1 depicts the algorithm for the preferred routine where the 'system perimeter' cause the variable speed drive to increase or decrease the speed of compressor to avoid shutdown. Table 1 shows an exemplary algorithm that compares a head psi to various values to calculate proximity to high head pressure set point; whether the spread limit is within range; whether max operating pressure is exceeded, etc. Appropriate action such as decreasing output frequency is taken. This algorithm is but an example, depending on the designed system a similar algorithm is easy to construct following the principles of the present invention with variables, values and actions appropriate for the designed system.

A system or apparatus of the present invention has a capability for tripping a shut down when a set point is met or exceeded. For example a set point for a head pressure might sound an alarm and trigger a shutdown when the head pressure reaches a set point of 360, psi. In this example the drive frequency is 60 hz. To prevent or avoid a shutdown the algorithm of the present invention operates to reduce drive frequency as the head pressure set point is approached. The algorithm may be set to operate starting at 320 psi head pressure for example. Below 320 psi, the system and apparatus would operate without interference from the improvement of the present invention.

Normally compressor speed is forever varying in an attempt to maintain a balanced dew point within normal conditions according to the particular dew point set point specifications. That is, under 'normal' condition the drive frequency is modulated (within upper and low limit set points) to maintain a stable dew point. In accordance with the present invention under abnormal condition (for example, elevated input values into the algorithm) the drive frequency is modulated in a safe mode to keep the unit running and supply some (but not a design specification optimal) amount of dew point suppression.

As head pressure increases the algorithm outputs a signal causing the drive frequency to diminish. The relationship may be linear, but may follow any pattern set in the algorithm, for example an exponential curve or a step function. For example, at 320 psi the algorithm would begin to operate and the algorithm may output a signal causing the drive signal to decrease 1 hz for every psi above 320. A head pressure of 330 psi would thus result in a drive frequency at about 50 hz; a head pressure of 330 would result in a drive signal of about 40 hz; a drive pressure of 350 would result in a drive frequency of about 30 hz; and in an extreme case just avoiding tripping a shutdown, a head pressure about 360 psi, the drive frequency would be at only about 20 hz. Perhaps the drive frequency may even approach or reach zero for a brief interval to attempt to regain a tolerable head pressure before restarting the system. The system would shut down the compressor for perhaps 1, 2, 3, 4, 5, or more seconds, and about 10, 15, 20, 25, 30, 35, 40, 45, or more seconds where head pressure decreases somewhat perhaps into a range where the algorithm does not at that instant in time affect the system and apparatus.

The air/gas user is altered to the fact that Dew point is compromised but complete operational shutdown is avoided. After recovery dew point may be brought within desired specifications. The head pressure is exemplary is this discussion. Temperature values, dew point, suction pressure, suction temperature, and superheat could similarly be incorporated into an algorithm used in the present invention as an input that affects processing according to the algorithm result in decreased drive frequency. The activation value for algorithm modulating influence to commence need not be a fixed value. For example the algorithm process may take into account a range of acceptable values for an input. A minimum might be assigned a value of 0%, while a maximum, e.g., a set point for shut off, may be set to 100% The algorithm is actuated at any desired value, for example, about 70, 75, 80, 85, 90, 95, 97, 98, 99, etc. % of the input value range.

The algorithm is a dynamic algorithm one that employs artificial intelligence (AI). The algorithm adjusts the value when it commences modulation and the amount of modulation depending on past experience. For example, the algorithm determines that a stronger suppression of drive frequency or an earlier onset of modulation is useful for preventing shutdowns. Artificial intelligence systems such as this have been used in many military applications and now are more common in civilian industry. Programming control of such systems is known in the AI arts.

The value where the algorithm commences drive frequency suppression need not be the same value that the algorithm ceases modulation. For example, the algorithm may be activated at 320 psi, but deactivated at 300 psi.

It should be further understood that the above routine is just an example. Also, the values are examples only. These values may be adjusted to reflect the many refrigerant types available for any given system or for the age and/or physical design properties of a system. Examples of refrigerant types are: R22, 410A, 407C, R12, 134a, 401a, 409A, 502, 404a, 507, 414b & 402a. Each of these refrigerants (or any other materials, such as ammonia), would have their own setting criterion; in a range approximately proportional to the above example in the specific system that they are used in. Those skilled in the art of refrigeration can simply adjust the indicated values to fit within the operating scope of any selected refrigerant. In systems employing AI values and weightings of the values are set without local operator input. The values provided above are for reference purposes only. It should be understood other combinations of values are also possible.

It will be understood that the foregoing description is illustrative of the invention and should not be considered as limiting and that other embodiments of the invention are possible without departing from the invention's spirit and scope. It is also to be understood that the following claims are intended to cover all the generic and specific features of the invention herein described, and all statements of the scope of the invention that, as a matter of language, might be said to fall therebetween.

TABLE 1

High head speed reduction algorithm

```
//  High Head Pressure Speed Reduction Algorithm high_head_psi
PROCESS_DISCHARGE_PRESSURE; high_head_psi .DISCHARGE_PRES_SP;
//  Calculate how close we are to the high head pressure set point
    high_head_psi += high_head_psi_offset;      //including offset
      if (high_head_psi > 0 1                   //Are we within spread limit of high head pressure?
    {if ( high_headpsi > high_head_psi_range }  // Are we above max operating pressure?
              //YES
```

TABLE 1-continued

High head speed reduction algorithm

```
max_pwm = pwtn at_40hz;              // Reduce output to 40Hz
    else           //NO
        {
max_pwm = ( MAX_PWM - }              // Reduce output speed proportionately
( ( ( MAX_PWM - _pwm_at_40hz)        // based on how close we are to set point.
        high_head_psi range )        //over the high head psi range
            / high_head psi_range) )
        }
if ( _pwtn > maxpwm                  // Output cannot be larger than
_pwm = max_pwm;                      // previously determined maximum
}
```

What is claimed is:

1. A system and apparatus controlling a variable speed compressor system for an air or gas dryer device, said system and apparatus comprising:
   a set point value that is a discharge pressure value that causes system failure shut down when reached;
   an algorithm that operates using said set point value to prevent an actual failure shutdown;
   a sensor that provides an input value to said algorithm whereupon said algorithm compares said input value to said set point value;
   a circuit carrying output of said algorithm;
   a controlled device responding to said output; and
   a feedback circuit that operates to maintain a product value below said set point value that causes system failure shut down;
said algorithm operating to modulate or bypass the feedback circuit when said input value approaches said set point.

2. The system and apparatus according to claim 1, wherein said product value is a dew point value.

3. The system and apparatus according to claim 1, wherein said controlled device is a variable compressor.

4. The system and apparatus according to claim 1, wherein said feedback circuit is modulated or bypassed when said input value reaches or exceeds about a value selected from the group consisting of 80%, 85%, 90%, 95%, 98% and 99% of said set point value.

5. The system and apparatus according to claim 1, wherein said set point is an upper bound of a range of acceptable values, the minimum at 0% and the set point at 100%, and said feedback circuit is modulated or bypassed when said input value reaches or exceeds about a value selected from the group consisting of 80%, 85%, 90%, 95%, 98% and 99% of said range.

6. The system and apparatus according to claim 1, wherein said system and apparatus comprises a refrigerant selected from the group consisting of R22, 410A, 407C, R12, 134a, 401a, 409A, 502, 404a, 507, 414b and 402a.

7. The system and apparatus according to claim 1 wherein the sensor provides a discharge pressure value to the algorithm; and the controlled device is a compressor.

8. A system and apparatus controlling a variable speed compressor system for an air or gas dryer device, said system and apparatus comprising:
   a set point value that is a discharge pressure value that causes system failure shut down when reached;
   an algorithm that operates to avoid reaching said set point value to prevent an actual failure shut down;
   a sensor that provides an input value to said algorithm whereupon said algorithm compares said input value to a value range corresponding to said input; and
   a circuit carrying output of said algorithm to a controlled device responding to said output to avoid reaching said set point;
   a circuit carrying output of said algorithm to an alarm device responding to said output to warn a user of failure to maintain a desired output value of dew point due to suspension of dew point control because of adverse conditions;
   said algorithm operating to modulate the controlled device when said input value is outside the value range corresponding to said input.

9. The system and apparatus according to claim 8, wherein said input value is selected from the group consisting of cooling water temperature, air inlet temperature, ambient temperature, and air how volume.

10. The system and apparatus according to claim 9, wherein the airflow volume is selected from the group consisting of airflow over a condenser element and compressed air output from a compressor.

* * * * *